No. 817,647. PATENTED APR. 10, 1906.
L. P. LOWE.
GAS MAKING APPARATUS.
APPLICATION FILED JAN. 30, 1905.

Witnesses
K. Lockwood-Nevins
B. A. Trash

Inventor
L. P. Lowe,
By
F. M. Wright,
Attorney

UNITED STATES PATENT OFFICE.

LEON P. LOWE, OF SAN FRANCISCO, CALIFORNIA.

GAS-MAKING APPARATUS.

No. 817,647.     Specification of Letters Patent.     Patented April 10, 1906.

Application filed January 30, 1905. Serial No. 243,170.

*To all whom it may concern:*

Be it known that I, LEON P. LOWE, a citizen of the United States, residing at San Francisco, in the county of San Francisco and State of California, have invented certain new and useful Improvements in Gas-Making Apparatus, of which the following is a specification.

This invention relates to improvements in gas-making apparatus, the object of the invention being to provide an apparatus for making gas from oil which will avoid the rapid disintegration of the refractory material heretofore resulting from contact of the oil with said material when in a highly-heated condition, which will also avoid the emission of smoke, and which will effect a saving of coke generated in the making of the gas.

My invention therefore resides in the novel construction and combination and arrangement of parts for the above ends, hereinafter fully specified, and particularly pointed out in the claims.

Figure 1:
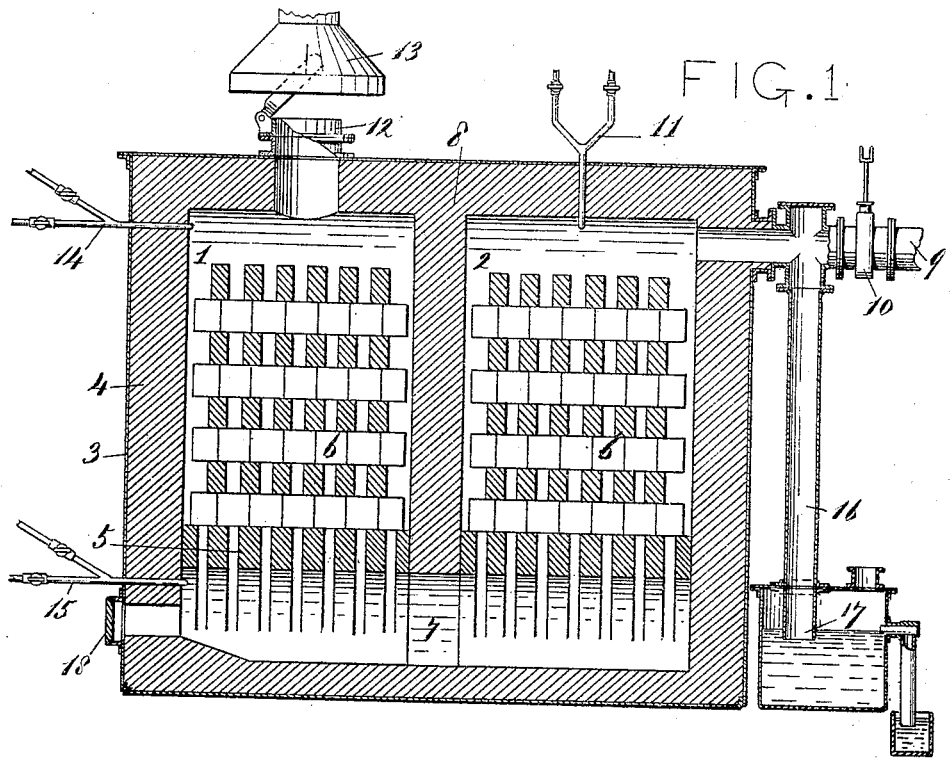
Figure 2:
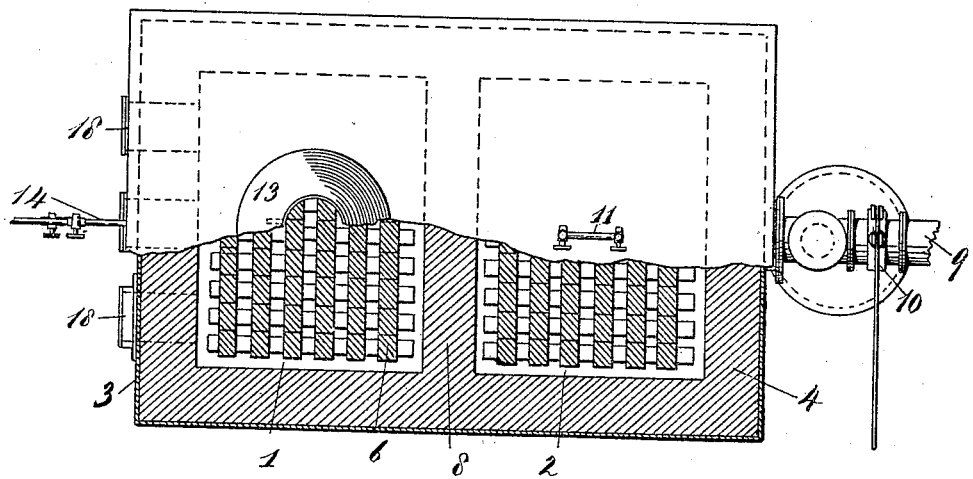

In the accompanying drawings, Figure 1 is a longitudinal vertical section of the apparatus. Fig. 2 is a broken plan view thereof.

Heretofore in the manufacture of gas from oil an apparatus has been used comprising a chamber containing refractory material and provided with suitable inlets and outlets for air, steam, oil, and gas, wherein the flames of combustion of the oil are caused to pass through the chamber to highly heat the refractory material, and then the combustion of fuel is stopped and steam is supplied and conducted through the chamber, coming in contact with the highly-heated refractory material and being superheated and in which also oil is supplied to mingle with the steam, effecting the decomposition of the superheated steam and forming therewith fixed combustible gases. In all such cases the oil has been injected at a higher level than the heated refractory material. This apparatus and the corresponding process of making gas were open to several objections. The most serious of these was that the impact of the comparatively cool oil upon the very highly heated refractory material, causing a sudden fall in temperature of said material and a correspondingly-sudden shrinkage thereof, tended to very rapidly disintegrate said material, so that it had to be constantly renewed, thus occasioning great expense. A further defect of this apparatus was that after the step of gas-making had ceased and when the step of heating the refractory material commenced there would remain a considerable quantity of carbonaceous material deposited upon the refractory bricks in the chamber to which air could not obtain access to burn the same, it being remote from the passage for admission of air, such air as was admitted being required for burning the oil which was admitted at the bottom of the chamber to heat the refractory material. This unconsumed coke or other carbon residue would pour forth from the stack in a large volume of smoke, evidently in itself an objectionable result, besides the loss of heat values of the coke thus driven off in the form of smoke. In the present invention these defects are avoided, and for this purpose the apparatus is divided into two chambers 1 2, surrounded by a casing 3, lined with a refractory material 4, each chamber being provided with arches 5 at the bottom and loosely-piled refractory material 6, resting upon said arches, said chambers connecting by an opening 7 at the bottom of a dividing-wall 8. Air is admitted to the top of the chamber 2 through a pipe 9, controlled by a valve 10, and oil is also admitted to the top of said chamber by a pipe 11. The oil being burned with the air, the flames pass down through the loosely-piled refractory material 6 and through the arches at the bottom of chamber 2, then through the arched passage-way 7 between the two chambers, then up through the arches at the bottom of chamber 1, then through the loosely-piled refractory material 6 in said second chamber 1, and out through the valve 12 and the stack 13. When the combustion of the fluid fuel has been continued for a sufficient length of time, the air and oil are shut off, the valve 12 is closed, and steam is admitted at the top of the second chamber 1 through a pipe 14, which steam passing down through the loosely-piled refractory material 6 in said second chamber becomes superheated. To said steam is added at the bottom of said second chamber oil from an oil-supply pipe 15, directed beneath the arches of said second chamber. The bottoms of the two chambers being closed on all sides except through the arches constitute, in effect, a retort by which the oil is distilled and coke is formed. Indeed, a retort of the usual form might be introduced at the bottom of these chambers, the oil being injected into this retort, the retort being open at the top to permit the escape of the gas; but such an addition is unnecessary, as it would accomplish nothing more than that obtained by the "retort" of my present construction.

The gases distilled from the oil, together with the superheated steam, pass into the first chamber through the arches and holes through the refractory material therein and by the heat of said refractory material and arches become converted into fixed combustible gases, then passing down by the pipe 16 to the seal 17.

By injecting the oil which is to be converted into gas underneath the refractory material instead of on the top thereof, as heretofore, it is insured that the refractory material will not be in direct contact with the oil, but only with the vapor arising therefrom, which vapor will have been raised to a sufficiently high temperature not to materially damage the refractory material by causing too rapid shrinkage thereof. Hence said refractory material will last much longer than heretofore. Again, there will now be no deposition of coke or other carbonaceous material upon the refractory material, but what is formed will fall to the bottom of the retort, the volatile portions being distilled. Therefore upon commencing the step of heating up no carbon will be driven off unconsumed in the form of smoke through the stack; also, this coke falling to the bottom can be scraped out from time to time through a door 18. The solid hydrocarbon will have been perfectly coked, any gaseous components thereof being driven off and consumed during the step of heating the refractory material.

If it is desired to increase the quantity of coke produced, it is only necessary to increase the amount of oil fed into the retort-chamber, or, if desired, coal may be fed into said chamber through the door 18.

I claim—

1. An apparatus for generating gas comprising a casing, a wall having an opening at the bottom dividing the interior into two chambers connected at the bottom, arches at the bottom of each chamber and loosely-piled refractory material upon each arch, means for admitting air and oil at the top of the first chamber, a stack at the top of the second chamber, means for closing the passage for the air and the passage to the stack, a steam-inlet at the top of the second chamber, a gas-outlet at the top of the first chamber, and an oil-inlet at the bottom of one of said chambers, substantially as described.

2. An apparatus for generating gas comprising a casing, a wall having an opening at the bottom dividing the interior into two chambers connected at the bottom, arches at the bottom of each chamber and loosely-piled refractory material upon each arch, means for admitting air and oil at the top of the first chamber, a stack at the top of the second chamber, means for closing the passage for the air and the passage to the stack, a steam-inlet at the top of the second chamber, a gas-outlet at the top of the first chamber, an oil-inlet at the bottom of one of said chambers, and a suitably-controlled opening for drawing off coke from the bottom of the two chambers, substantially as described.

In witness whereof I have hereunto set my hand in the presence of two subscribing witnesses.

L. P. LOWE.

Witnesses:
 FRANCIS M. WRIGHT,
 BESSIE GORFINKEL.